C. E. DE BOOS.
PNEUMATIC HUB.
APPLICATION FILED AUG. 2, 1911.

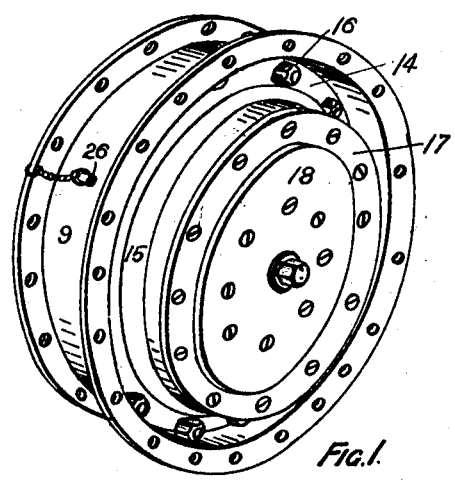
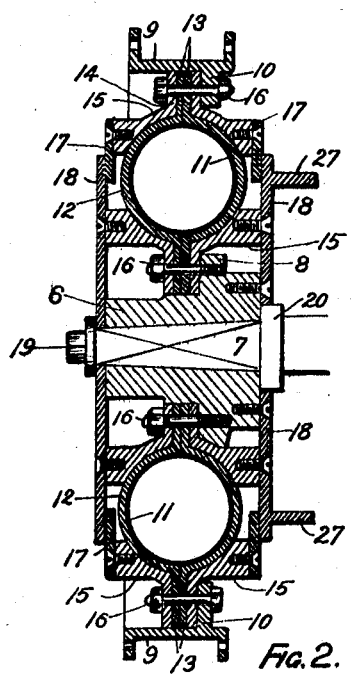
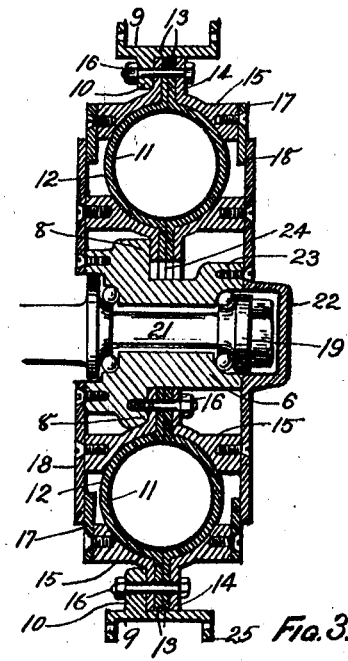

1,019,591.

Patented Mar. 5, 1912.
2 SHEETS—SHEET 2.

Witnesses
A. J. Moran
Arnelle Baere

Inventor:
Charles Edward de Boos
by B. Singer atty.

UNITED STATES PATENT OFFICE.

CHARLES EDWARD DE BOOS, OF TEMORA, NEW SOUTH WALES, AUSTRALIA.

PNEUMATIC HUB.

1,019,591.

Specification of Letters Patent.

Patented Mar. 5, 1912.

Application filed August 2, 1911. Serial No. 641,945.

*To all whom it may concern:*

Be it known that I, CHARLES EDWARD DE BOOS, a subject of the King of Great Britain and Ireland, and residing at Temora, in the State of New South Wales, Commonwealth of Australia, have invented new and useful Improvements in Pneumatic Hubs, of which the following is a specification.

This invention relates to means for providing resiliency in wheels for use on motor vehicles in substitution for the pneumatic tired wheels now generally used.

The immediate purpose of the invention in giving effect to the above object is to provide a hub for a wheel of such a vehicle, which will in itself afford such resiliency as to obviate the use of the pneumatic tire with its attendant disadvantages.

In carrying my invention into effect I propose to construct a hub in two main concentric parts and insert between them an annular pneumatic ring protected by a suitable cover also constructed in two parts and secured in such a manner that the torsional driving strain is communicated thereby from the inner to the outer hub member, while side thrust is resisted by suitable side plates so constructed and arranged as to permit of radial movement of the outer hub member relative to the axle.

Figure 4:
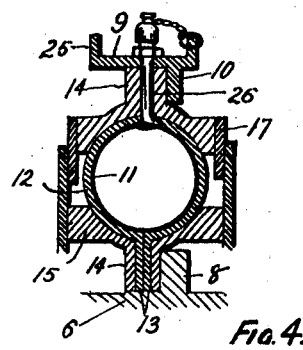
Figure 5:
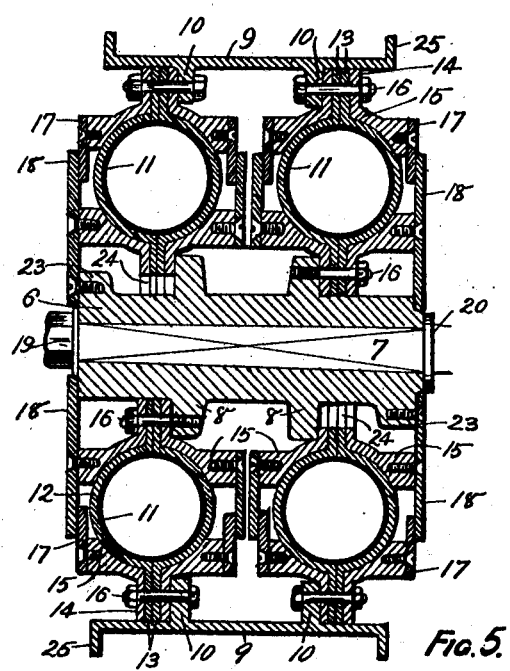

In order to indicate the practical application of this invention reference will now be made to the accompanying drawings which form part of this complete specification and in which:—Figure 1 shows a perspective external view of the hub complete; Fig. 2 is a cross sectional elevation of the same; Fig. 3 is a cross sectional elevation of the same as applied to one of the free or non-driving wheels of a vehicle; Fig. 4 is a part sectional view showing the arrangement of the valve for inflating the tube; Fig. 5 is a cross sectional elevation of a duplex hub arranged on a driving axle.

The same numerals are used to indicate corresponding parts in all the views, but I will refer firstly to Figs. 1 and 2. The inner hub member or bush 6 is secured to the tapered end 7 of the driving axle by suitable means such as keying, or, as shown in the figures now referred to, by forming the tapered portion of the axle with square section and boring the bush correspondingly. The bush is provided with an annular flange 8, and the outer member 9, which consists of an annular ring (hereinafter referred to as the outer ring) has a corresponding inwardly projecting flange 10. The annular pneumatic tube 11 is contained within the circumferentially divided annular protective cover 12 the inner and outer flanges 13. 13. of which are gripped between the corresponding annular flanges 14. 14. of the inner and outer rim pieces 15. 15. The face of one of the inner rim flanges bears against the flange 8 and that of one of the outer rims against the flange 10, and the two pairs of rim flanges with the cover flanges between them are secured to the flanges 8 and 10 by bolts 16. 16. I have found that the method described of gripping the cover flanges between the rim flanges affords an efficient and simple means of transmitting the torsional strain from the inner bush 6 to the outer ring 9 provided the cover is made of material or a combination of materials sufficiently strong for the purpose. Owing to its great tensile strength and resistance to any tearing force green hide is eminently suitable for the particular purpose. To resist side thrust tending to distort the hub and to protect the inner parts, duplex side plates are provided upon each side of the hub. Each set of side plates consists of an annular plate 17 attached to one of the outer rim members 15, and a central plate 18 bearing against the outside of the former and attached to the inner ring member and to the central bush or the axle. This arrangement permits of compression of the pneumatic tube, and by securing the center plate to the bush or under the axle cap 19 on the outside of the hub, or against the axle shoulder 20 on the inside, prevents lateral distortion of the hub. In the case of driving wheels the brake sheave or drum may conveniently be affixed to or made integral with the central side plate on the inside of the hub as shown in Fig. 2 at 27.

Referring to Fig. 3 it will be seen that the journal and the bush 6 are provided with ball races to accommodate the ball bearings 21. This arrangement is suitable for free running wheels as distinct from driving wheels. In the case of free wheels the side plates on both the inside and outside of the hub must be clear of the non-rotating axle, and if desired the outside center plate may be dished at 22 to cover the cap and exclude dust from the bearings. For the purpose of securing this plate to the center bush by screws, the latter may be thickened in places by bosses such as 23 to provide sufficient metal to retain the screws, and the flanges on the inner rims are cut away correspondingly as at 24 to permit the rims to pass over the said bosses.

Fig. 5, showing the double hub, is merely a duplication of the parts already described and further description thereof is considered unnecessary.

The arrangement of the inflating valve is shown in Fig. 4, the valve casing 26 being secured to the pneumatic tube in the usual way, passes between the flanges 14. 14., the cover flanges 13. 13. being cut away at that point to so permit. I do not however confine myself to this arrangement of the valve as the location and disposition thereof may be altered as may be deemed advisable under varying circumstances.

The outer ring 9 is shown provided with external flanges 25. 25. for securing radial or tangential tension spokes.

What I claim and desire to secure by Letters Patent is:—

1. A pneumatic hub comprising in combination, a central hub bush, annular flanges projecting therefrom, an annular pneumatic cushion surrounding said bush, a two-part sheath or cover for said cushion, a two-part inner ring seat for said cushion, means securing the inner ring seat and the cover to said bush, a two-part outer ring seat provided with flanges engaging the flanges of said bush, and means for securing the sheath and the parts of said outer ring seat together, substantially as described.

2. A pneumatic hub comprising in combination, a central hub bush, annular flanges projecting therefrom, an annular pneumatic ring cushion surrounding said bush, a two-part sheath or cover for said cushion provided with flanges, a two-part inner ring seat for said cushion anchored to said annular flanges of said bush, means securing the inner ring seat and the flanges of said cover to said bush, a two-part outer ring seat provided with flanges engaging the flanges of said bush, and means for securing the flanges of the sheath and the parts of said outer ring seat together, substantially as described.

Signed at Sydney, New South Wales, this 4th day of July 1911.

CHARLES EDWARD DE BOOS.

Witnesses:
 WM. NEWTON,
 CHAS. HATTON.